(12) United States Patent
Giger

(10) Patent No.: US 7,030,969 B2
(45) Date of Patent: Apr. 18, 2006

(54) DISTANCE MEASURING INSTRUMENT WITH A SIGHTING DEVICE

(75) Inventor: Kurt Giger, Rüthi (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 10/758,111

(22) Filed: Jan. 16, 2004

(65) Prior Publication Data

US 2004/0145720 A1 Jul. 29, 2004

Related U.S. Application Data

(63) Continuation of application No. PCT/CH02/00335, filed on Jun. 20, 2002.

(30) Foreign Application Priority Data

Jul. 17, 2001 (CH) .................................. 1315/01

(51) Int. Cl.
*G01C 3/08* (2006.01)

(52) U.S. Cl. .................... 356/5.02; 356/5.01; 356/5.04

(58) Field of Classification Search ...... 356/5.01–5.15; 396/89–152
See application file for complete search history.

(56) References Cited

U.S. PATENT DOCUMENTS

| | | | | |
|---|---|---|---|---|
| 4,386,848 A | * | 6/1983 | Clendenin et al. | 356/5.01 |
| 4,920,412 A | * | 4/1990 | Gerdt et al. | 348/31 |
| 5,870,180 A | * | 2/1999 | Wangler | 356/4.01 |
| 6,323,941 B1 | * | 11/2001 | Evans et al. | 356/4.01 |
| 6,349,174 B1 | * | 2/2002 | Ray et al. | 396/106 |
| 6,801,305 B1 | * | 10/2004 | Stierle et al. | 356/4.01 |
| 6,822,681 B1 | * | 11/2004 | Aoki | 348/296 |

FOREIGN PATENT DOCUMENTS

| | | |
|---|---|---|
| DE | 199 22 321 A1 | 11/2000 |
| EP | 0 481 278 A1 | 4/1992 |
| EP | 0 661 519 A1 | 7/1995 |
| WO | 00/25089 A1 | 5/2000 |

* cited by examiner

*Primary Examiner*—Thomas H. Tarcza
*Assistant Examiner*—Isam Alsomiri
(74) *Attorney, Agent, or Firm*—Buchanan Ingersoll PC

(57) ABSTRACT

A distance measuring instrument having a sighting device is disclosed, which includes a transmitter for emitting an optical radiation, a receiving lens for the optical measurement radiation remitted or scattered by an object being measured, a receiver, located behind the receiving lens, for converting the optical radiation into electrical measurement signals, and a signal processing system for comparing the measurement signals with reference signals in order to determine from them the distance from the object being measured and to make the result available to the user. The sighting device includes a photoelectric picture-taking system, which is connected to an electronic display device, and an evaluation unit for forming the differential value for the pictures taken. The photoelectric picture-taking system of the sighting device and the electronic display device are disposed in a common housing which is equipped with a separate viewfinder lens for the photoelectric picture-taking system.

18 Claims, 2 Drawing Sheets

US 7,030,969 B2

DISTANCE MEASURING INSTRUMENT WITH A SIGHTING DEVICE

CROSS REFERENCE TO RELATED APPLICATIONS

This application claims priority under 35 U.S.C. §119 to Swiss Application 1315/01 filed in Switzerland on 17 Jul. 2001, and as a continuation application under 35 U.S.C. §120 to PCT/CH02/00335 filed as an International Application on 20 Jun. 2002 designating the U.S., the entire contents of which are hereby incorporated by reference in their entireties.

BACKGROUND

The invention relates to a distance measuring instrument with a sighting device. The invention also relates to a method for detecting a spot on an object being measured whose distance is to be determined.

Distance measuring instruments of this generic type are well known in the prior art. They have a distance measuring range of several tens of meters and are often embodied as handheld instruments. They are used primarily in construction surveying or in interior renovation, for instance for measuring rooms in three dimensions. Other areas of application for distance measuring instruments are geodetic and industrial surveying. The fundamental principle of distance measurement with the known instruments is based on evaluating a change over time in a characteristic variable of the electromagnetic radiation emitted by the instrument and remitted by an object sighted. To that end, the distance measuring instrument is equipped with a transmitter for emitting an intensity-modulated radiation. In handheld instruments, this is primarily an optical radiation in the visible wavelength spectrum, to make it easier to aim at the measurement spots. The optical radiation is remitted or scattered by the object being measured aimed at and is recorded by a receiver built into the instrument. From the time lag of the modulated radiation received compared to the radiation emitted by the transmitter, the distance from the object being measured is found.

In indoor rooms, the visible radiation used in handheld instruments, generally laser radiation, is readily apparent to the eye on the object being measured. However, if light shines intensively on the object being measured, the eye has difficulty in distinguishing the spot from the background. This is particularly true in outdoor applications, in which the object being measured is often exposed to quite intensive sunshine, and the spot remitted by the object being measured can often be perceived only with difficulty, if at all, by the naked eye. To overcome this problem, users of the distance measuring instrument sometimes put on glasses provided with optical filters, which allow only the measurement radiation reflected by the object being measured to pass through them. The special glasses used for this purpose are at high risk of breaking and are often not directly at hand, and the user often finds them annoying and bothersome. In known distance measuring instruments, telescopic sights that can be mounted on the instrument are also known as an alternative way of solving this problem. These telescopic sights are intended to help the user of the distance measuring instrument recognize the spot on the object being measured to be surveyed or measured. Telescopic sights are also already known that are additionally provided with special filters that are attuned to the light of the spot. Telescopic sights can be complicated and expensive. In particular, telescopic sights or similar optical sighting aids are calibrated with the laser beam. This makes such instruments very vulnerable to shock. To overcome this disadvantage and not unnecessarily increase the weight of the distance measuring instrument, the telescopic sight is often embodied as a separate part, which is to be mounted on the distance measuring instrument only when needed, and which must then be calibrated. The separate distance measuring instrument is vulnerable to damage. Often, the user fails to carry it with him, or it gets lost entirely. After being mounted, it must first be recalibrated with the laser beam.

SUMMARY

Exemplary embodiments of the present invention overcome disadvantages of the distance measuring instruments of the prior art. An exemplary distance measuring instrument can be modified in such a way that even under unfavorable lighting conditions, and especially with objects being measured in strong light, a spot created on the object being measured aimed at can be identified simply and unambiguously. Exemplary embodiments should be simple and economical to achieve this. The instrument should be compact enough to be held in the hand and should permit flexible use.

Exemplary embodiments of the present invention are directed to a hand-held distance measuring instrument with a sighting device. An exemplary method is also disclosed for detecting a spot on a object being measured whose distance is to be determined.

An exemplary distance measuring instrument having a sighting device is disclosed which includes a transmitter for emitting an optical radiation, a receiving lens for the optical measurement radiation remitted or scattered by a object being measured, a receiver, located behind the receiving lens, for converting the optical radiation into electrical measurement signals, and a signal processing system for comparing the measurement signals with reference signals, in order from them to determine the distance from the object being measured and to make the result available to the user. The sighting device includes a photoelectric picture-taking system, which is connected to an electronic display device, and an evaluation unit for forming the differential value for the pictures taken. The photoelectric picture-taking system of the sighting device and the electronic display device are disposed in a common housing which is equipped with a separate viewfinder lens for the photoelectric picture-taking system.

An exemplary sighting device equipped with a photoelectric picture-taking system for the distance measuring instrument exploits the far greater photosensitivity of such systems, compared to the human eye. Thus the preconditions for detecting a spot created on the object being measured even under unfavorable lighting conditions are achieved. Furthermore, the sighting device has an evaluation unit for finding the differential value for the signals or data furnished by the photoelectric picture-taking system and also has an electronic display device, which makes it possible for the picture of the object being measured that is taken by the picture-taking system to be displayed to the user, optionally after processing of the signals or data. Thus the user can check directly whether the distance measuring instrument is in fact shining on the object being measured, whose distance from the instrument is to be determined. Such optical aids as special glasses or a special telescopic sight, which are at risk of breaking and are easily lost or forgotten, can thus be dispensed with. Hence calibration of the telescopic sight is also unnecessary. Instead of calibration, the picture segment displayed to the user can be selected by software. The photoelectric picture-taking system of the sighting device and the electronic display device are disposed in a common housing, which is equipped with a separate viewfinder lens for the photoelectric picture-taking system. The components for distance measurement and the components of the sighting device with the electronic display device are disposed separately from one another and can be operated independently of one another. The result is greater flexibility in terms of the overall conception of the distance measuring instrument.

Exemplary photoelectric picture-taking systems are digital cameras, which are available in very compact form as integrated semiconductor components, such as CMOS design components. By now, digital cameras with photoelectric semiconductors with 3 megapixels and more are quite inexpensive. The high resolution of digital cameras allows very precise aiming at the object being measured.

Expediently, the high resolution of digital cameras can also be utilized, in conjunction with the evaluation unit, to achieve an electronic zoom function as well. This has the advantage that the user can first orient himself roughly and once he has the object being measured correctly in sight he can zoom down to the measurement region and then locate the spot in the measurement environment exactly.

To improve the signal-to-noise ratio, in an advantageous exemplary variant, a photoelectric picture-taking system, such as a monochromatic digital camera, that has a photoelectric semiconductor component with monochromatic photosensitivity can be used. An optical bandpass filter with a transmission in the wavelength range of the optical radiation of the distance measuring instrument is located in front of the light-sensitive detection face of the digital camera.

In an alternative variant embodiment, a color camera is used that has a color camera chip which is embodied for detecting the three primary colors. The color camera chip already has optical filters for the red, green and blue spectral range. For instance, if laser radiation in the red wavelength range is projected at the object being measured, and only the red component of the picture furnished by the color camera is used for evaluation, this can improve the signal-to-noise ratio of the laser spot, detected in the picture, considerably compared to the ambient radiation.

The sighting device can also be integrated with a separate device. This separate device is for instance a palmtop or laptop computer with an integrated camera. The processing of the signals or data furnished by the camera can be done in the computer. The picture is output via the display or the screen of the computer. The computer and the distance measuring instrument can be connected to one another in order to synchronize the radiation source, such as the laser, and the picture-taking. The connection can be made via a wireless connection, for instance by the Bluetooth standard. Equipped in this way, the computer can be used as a sighting device. This variant is especially suitable for retrofitting of existing distance measuring instruments.

In another advantageous variant embodiment, the sighting device can be integrated with the distance measuring instrument. To that end, for instance in the vicinity of its emission port for the optical radiation, for instance the laser radiation, the distance measuring instrument can have a digital camera with a viewfinder lens, and this digital camera can be connected to an evaluation device, present in the distance measuring instrument, for finding the differential value of the pictures taken. A display or the like can be disposed on the instrument housing for displaying the pictures taken by the digital camera. This integrated variant embodiment can be especially easy to manipulate and requires no additional devices.

In an exemplary method, for detecting a spot on a object being measured whose distance is to be determined, the object being measured is lighted with an optical radiation, such as a laser radiation in the visible spectrum, with the aid of a distance measuring instrument. The spot created on the object being measured is recorded with the aid of a photoelectric picture-taking system and delivered to an evaluation unit, which forms differential values of the pictures taken, and the results are displayed on an electronic display device. The aiming is already done directly with the measurement radiation or laser of the distance measuring instrument. This reliably prevents mistakes, and an additional parallax correction can be dispensed with. Using a photoelectric picture-taking system makes use of the extraordinarily high photosensitivity of such systems. Digital cameras with integrated semiconductor recording chips based, for example, on CMOS design, can be used. CMOS components consume relatively little current. They are thus particularly well suited for portable devices that have batteries or accumulators.

By now, relatively inexpensive digital cameras with very high resolution are already available. As a rule, the resolution is higher than needed for identifying a spot on a display device, screen, display or the like. Because of the high sensitivity that digital cameras have, it is often possible, under good lighting conditions, that is, with an only weakly illuminated surrounding area and at short distances, to use only a single picture. In a simple exemplary variant, under favorable lighting conditions, a marking, on the order of cross-hairs in a telescope, can be incorporated into the picture shown on the display device. Electronic detection of the spot can then be dispensed with. All that is needed is recalibration from time to time, on the specification of the incorporated marking. Parallax that occurs from the offset of the laser beam relative to the camera optics, can then be determined by approximate distance measurement and can be corrected automatically.

For reliable location of the spot, at least one picture of the object being measured without, and at least one picture of it with, introduced optical radiation is taken by the photoelectric picture-taking system. From the electronically converted pictures, in the evaluation unit a differential picture is ascertained in which the spot is detected electronically. The site of the detected spot is highlighted in the picture of the object being measured shown on the electronic display device by means of an incorporated mark or the like.

If the lighting conditions are very poor, for instance because the spot on the object being measured is washed out by excessive light, as can be the case in intensive sunshine, identifying the spot is made possible by averaging many pictures. To that end, a plurality of pictures of the object being measured in rapid chronological succession can be taken with and without introduced optical radiation. Since small movements and jarring can cause the picture segment to shift, one picture with and one without the laser spot are always taken immediately one after the other, and a differential picture is ascertained from them. The differential pictures can be averaged. This provision has a very advantageous effect on the signal-to-noise ratio, since unwanted noise is filtered out in the averaging process.

To improve the signal-to-noise ratio, it proves to be advantageous if during the taking of the picture or pictures of the object being measured with introduced optical radiation, the radiation power is synchronously increased by, for example, a factor of approximately 2 to approximately 20.

While for continuous operation of such instruments equipped with lasers, safety standards limit the average laser power to a particular level, in the pulsed mode it is permissible for higher powers to be employed briefly.

In an alternative method, to improve the signal-to-noise ratio, the object being measured can be recorded with a monochromatic picture-taking system, such as a monochromatic shooting camera with a photoelectric semiconductor component, particularly a CMOS-based component. The radiation remitted or scattered by the object being measured can be passed beforehand, at least intermittently, through a bandpass filter with a transmission in the wavelength range of the introduced optical radiation.

Another possibility for improving the signal-to-noise ratio uses a color camera for taking the picture of the object being measured. For example, only the portion of the picture corresponding to the wavelength spectrum of the introduced optical radiation is then further processed.

To make it possible to use existing distance measuring instruments, the optical radiation originating at the object being measured can be detected with the aid of a camera that is disposed in a separate device, such as a palmtop or laptop computer. The computer enables the further processing of the signals or data acquired. The screen or a display of the computer serves as the display device. The computer and the distance measuring instrument are connected to one another for that purpose, in order to synchronize the radiation source, such as the laser, and the picture-taking. The connection can be made via a wireless connection, for instance by the Bluetooth standard. Equipped in this way, the computer can be used as the sighting device.

An exemplary method of the invention can also be performed with a specially embodied distance measuring instrument. In that case, the picture-taking of the object being measured can be done with the aid of a photoelectric picture-taking system, such as a digital camera, which is integrated with the distance measuring instrument. The evaluation of the signals acquired is done with an evaluation unit disposed in the instrument. The signals or data acquired and processed are then shown on an electronic display device, such as a display or the like, that is provided on the distance measuring instrument.

BRIEF DESCRIPTION OF THE DRAWINGS

The invention is described in further detail below, with reference to an exemplary embodiment shown schematically in the drawings. Shown are.

DETAILED DESCRIPTION

Figure 1:
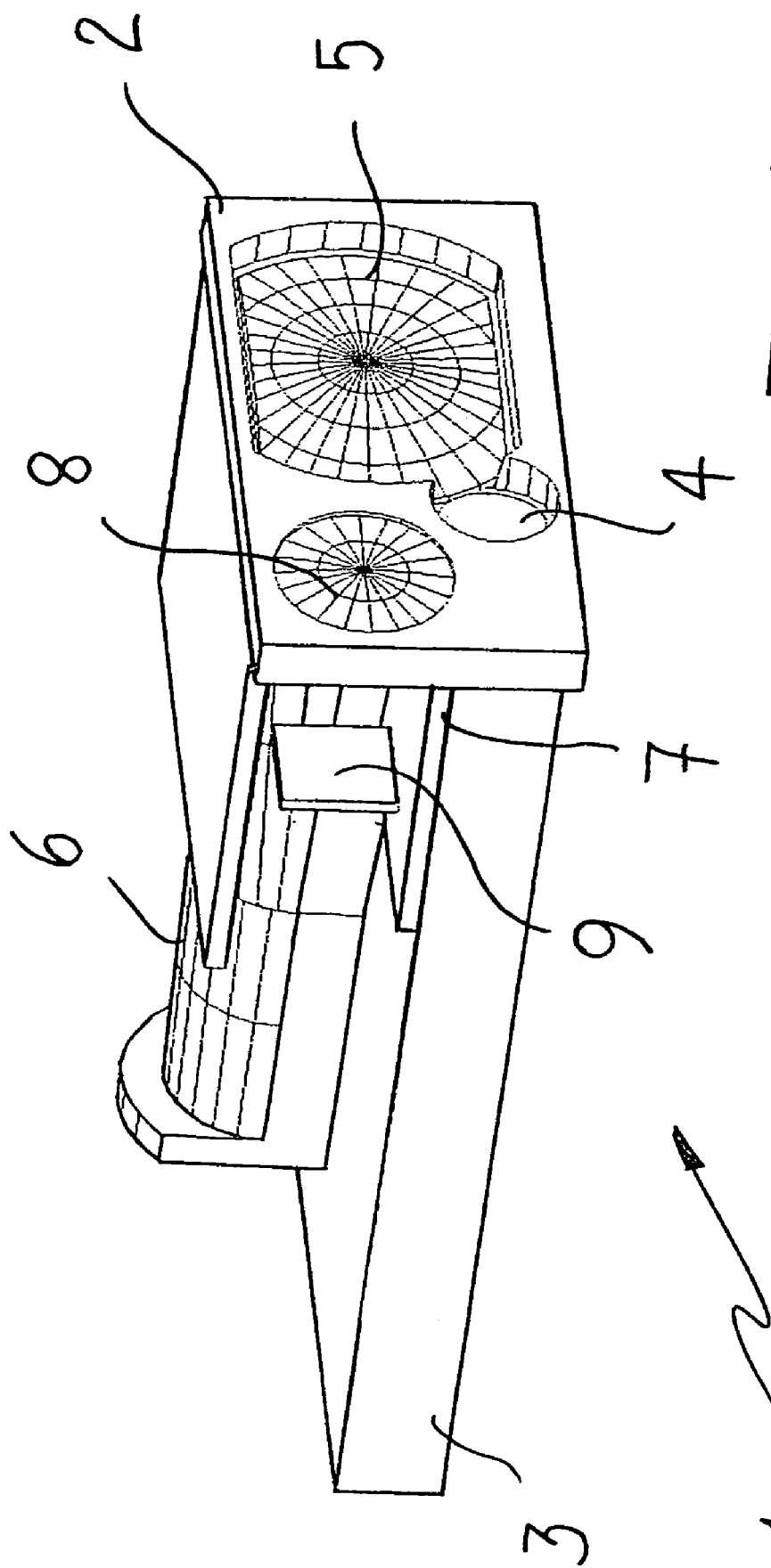
FIG. 1, a view of an exemplary distance measuring instrument of the invention.

FIG. 1 shows a schematic view of one exemplary embodiment of the distance measuring instrument, which is identified overall by reference numeral 1. The distance measuring instrument 1, in particular a laser distance measuring instrument, is shown without its covering housing, so that the parts of the apparatus that constitute the exemplary embodiment illustrated, can be seen. A plurality of openings are provided in the front panel 2 of the distance measuring instrument. One of these openings is an exit port 4 for the measurement beam of a laser, not identified by reference numeral in the drawing, disposed on a support plate 3. By far the majority of the front panel 2 is occupied by a receiving lens 5 for the measurement radiation remitted or scattered by a object being measured. An optoelectronic unit 6 is mounted on the support plate 3 behind the receiving lens 5. The optoelectronic unit 6 can be of conventional construction and includes a reference path, various optical elements such as a beam splitter, deflection mirror and the like, at least one photoelectric detector, signal converters, filters, and so forth. The measurement signals acquired and converted are sent on to a central signal processing system, which includes a memory unit and a microprocessor and is indicated at 7 in FIG. 1. To this extent, the distance measuring instrument 1 is similar to known instruments offered by the present applicant.

Also disposed on the front panel 2 is a viewfinder lens 8, behind which a picture-taking system, in particular a shooting camera 9 with a photoelectric recording chip, is disposed. The recording chip is for instance a semiconductor component based on CMOS design. The recording chip can be designed for monochromatic or colored pictures. Such components are well known and can for instance be procured from Intertec Components, Germany, or OmniVision, U.S.A., or any other desired source. The shooting camera 9 is connected to the signal processing system 7.

Figure 2:
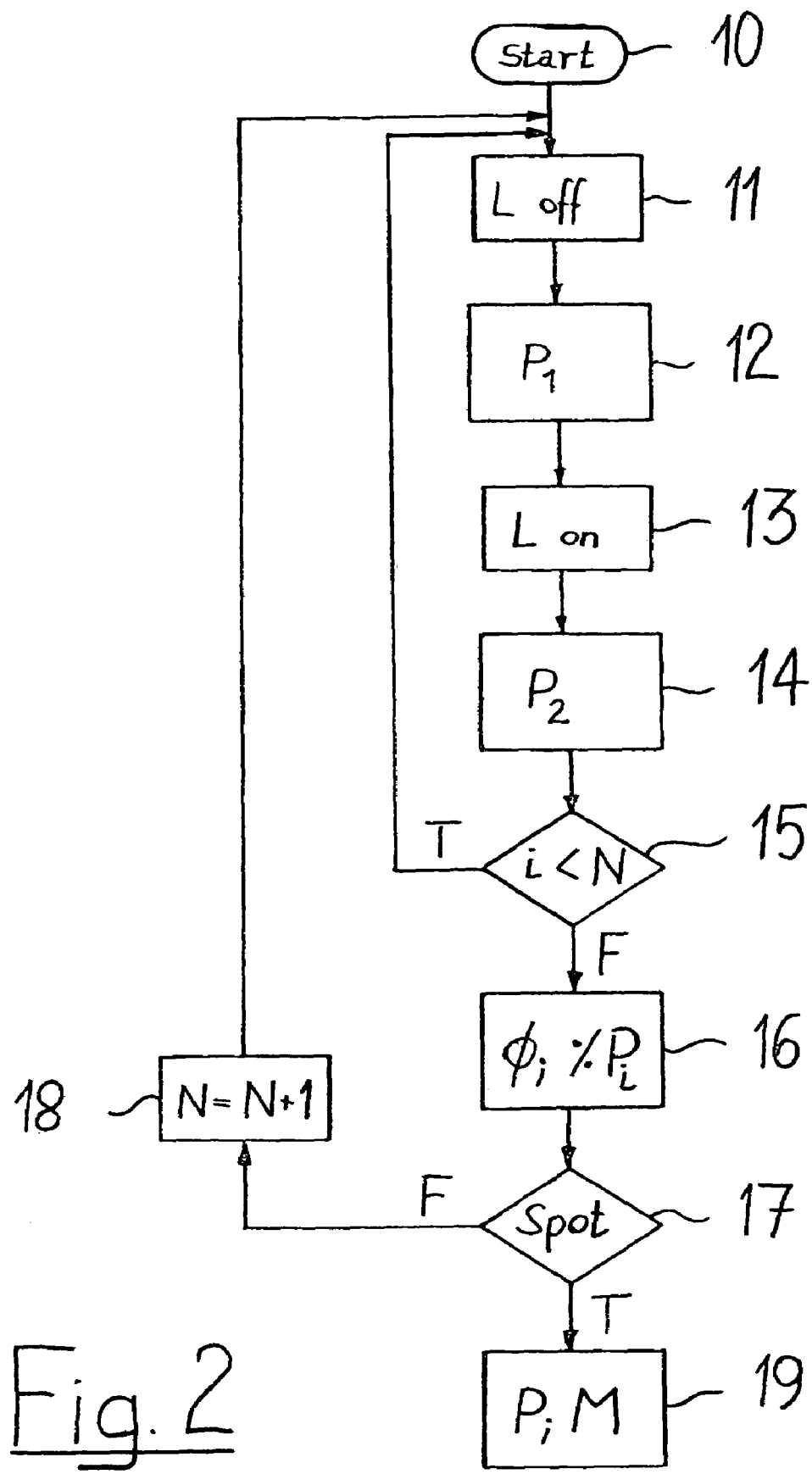
FIG. 2, an exemplary flow chart for explaining an exemplary method of the invention.

FIG. 2 shows the course of an exemplary method for detecting a spot on an object being measured whose distance is to be determined. Turning on the distance measuring instrument also starts an aiming routine in the signal detection unit. This is indicated in the flow chart by the starting position 10. After an initial approximate aiming at the object being measured, the laser is briefly switched off in the next step 11. After that, the picture 12 of the object being measured without laser irradiation is taken by the shooting camera and stored in memory. In a further step 13, the laser is turned back on again, and a further picture 14 of the object being measured with the spot, with the laser now shining on it, is taken and stored in memory. In an interrogation routine 15, a question is asked whether the number i of pictures taken is less than a preferably predeterminable maximum number N. If the predeterminable maximum number N has not yet been reached, further pictures of the object being measured are taken and stored in memory. In each case, one picture with, and one picture without, the laser spot is taken, and the difference between them is formed. This prevents mistakes in measurement that can occur from shifting of the aimed-at picture segment caused by jarring and displacements. When the maximum number N is reached, the differential pictures taken are averaged in a further step 16, in order to improve the signal-to-noise ratio. The resultant averaged differential picture is analyzed in an analysis step 17 for whether the spot is detectable in it. This can be done for instance by threshold value analysis of the brightness of the differential signals. If the analysis shows that the spot is not yet detectable on the object being measured, then the maximum number N of pictures to be taken is increased. This is indicated in step 18 by the programming-oriented relationship N=N+1. The relationship N=N+1 does not necessarily mean an increase of precisely one picture. The intention is merely to symbolize the fact that the maximum number N should be increased by either a fixedly set value or a value that can be input. If the spot on the object being measured is detected in the differential picture, then the display 19 of the picture of the object being measured on a display, screen or the like is accomplished. The location of the spot is highlighted by a mark that can preferably be incorporated electronically. This completes the aiming process, and the measurement of the distance of the object being measured can be accomplished.

The exemplary embodiment of the distance measuring instrument shown in FIG. 1 has a shooting camera integrated with the instrument. However, the invention is not limited to such instruments. For instance, the shooting camera can also be integrated with a laptop or a palmtop computer. The computer and the distance measuring instrument are to that end connected to one another in order to synchronize the laser and the picture-taking. The connection can be made via a wireless connection, for instance by the Bluetooth standard. Equipped in this way, the computer can be used as a sighting device. The method for detecting the spot can then be performed by the computer. The display of the picture of the object being measured and of the spot detected is done by way of the display or screen of the computer. The capacity of the computer makes it possible, by taking a plurality of pictures and ascertaining the distance information, to generate an electronic model, for instance of a building facade. The computer-generated electronic model then makes it possible to perform many further measurements in the office, using a physical model of the facade. This is advantageous for instance if a scaffold is to be set up on the facade, or if measurements of otherwise only poorly accessible regions of an object must be made.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A distance measuring instrument having a sighting device, comprising:
   a transmitter for emitting an optical radiation in the visible wavelength spectrum;
   a receiving lens for receiving optical measurement radiation remitted or scattered by an object being measured;
   a receiver, located behind the receiving lens, for converting the optical measurement radiation into electrical measurement signals; and
   a signal processing system for comparing the measurement signals with reference signals to determine a distance from the object being measured and to make a distance result available to a user, wherein the transmitter is configured for creating a visible measurement spot directly on the object to be measured, and wherein the sighting device includes:
      a photoelectric picture-taking system capable of taking pictures of the object with and without the measurement spot, which is connected to an electronic display device for taking pictures of the measurement spot on the object; and
      an evaluation unit for forming a differential value for pictures taken, the photoelectric picture-taking system of the sighting device and the electronic display device being disposed in a common housing which is equipped with a separate viewfinder lens for the photoelectric picture-taking system, the distance measurement instrument being a handheld device.

2. The distance measuring instrument of claim 1, wherein the picture-taking system includes a photoelectric semiconductor component, based on CMOS design.

3. The distance measuring instrument of claim 2, wherein the photoelectric semiconductor component has a monochromatic photosensitivity, and an optical bandpass filter with a transmission in a wavelength range of the optical radiation of the distance measuring instrument is located in front of a photosensitive detection face of the photoelectric semiconductor component.

4. The distance measuring instrument of claim 2, wherein the photoelectric semiconductor component is a color camera chip, which is embodied for detecting three primary colors.

5. The distance measuring instrument of claim 2, wherein the semiconductor component, in conjunction with the evaluation unit, has an electronic zoom function.

6. The distance measuring instrument of claim 1, wherein the photoelectric picture-taking system is integrated with a separate device that has a display or a screen and can be connected, in wireless fashion, to the distance measuring instrument.

7. The distance measuring instrument of claim 6, wherein the separate device is one of a palmtop and a laptop computer.

8. The distance measuring instrument of claim 1 integrated with a display, for displaying at least one of pictures taken by the photoelectric picture-taking system and the results of the evaluation unit for forming a differential value of the pictures taken, which is disposed on the distance measuring instrument.

9. A method for detecting a measurement spot on an object being measured whose distance is to be determined, comprising:
   lighting the object being measured, with the aid of a distance measuring instrument, using an optical radiation to create a measurement spot directly on the object being measured;
   detecting the measurement spot created on the object being measured with aid of a photoelectric picture-taking system; and
   delivering information about the detected measurement spot to an evaluation unit for finding a differential value, and for showing detection results on an electronic display device, wherein the photoelectric picture-taking system takes at least one picture of the object being measured without, and at least one picture with, the optical radiation; and wherein in the evaluation unit, from electronically converted pictures, a differential picture is ascertained in which the spot is detected electronically; and wherein at a site of the detected spot, an electronic marking is superimposed on the picture of the object being measured that is shown on the electronic display device.

10. The method of claim 9, wherein a plurality of pictures, in rapid chronological succession, of the object being measured with and without the optical radiation are taken, and the differential pictures ascertained from them are averaged.

11. The method of claim 9, wherein during the taking of the at least one picture of the object being measured with introduced optical radiation, radiation power is synchronously increased.

12. The method of claim 11, wherein the radiation power is increased by a factor of approximately 2 to approximately 20.

13. The method of claim 9, wherein pictures are taken of the object being measured with a monochromatic picture-taking system.

14. The method of claim 13, wherein the pictures are taken with a monochromatic shooting camera with a photoelectric semiconductor component based on CMOS, and radiation detected by the picture-taking system is at least intermittently beforehand passed through a bandpass filter with a transmission in a wavelength range of the optical radiation.

15. The method of claim 9, wherein the optical radiation originating in the object being measured is detected by a color camera, and only that portion of the picture corresponding to the wavelength spectrum of the introduced optical radiation is processed.

16. The method of claim 9, wherein the optical radiation originating at the object being measured is detected with a camera that is disposed in a separate device, which is equipped with its own evaluation unit and display device and is coupled with the distance measuring instrument.

17. The method of claim 9, wherein detection of the object being measured is done with a photoelectric picture-taking system which is integrated with the distance measuring instrument, and evaluation of signals detected is effected with an evaluation unit disposed in the instrument, and a display is effected on an electronic display device which is provided on the distance measuring instrument.

18. The method of claim 9, wherein the optical radiation is laser radiation in a visible spectrum.

* * * * *